Aug. 30, 1960   C. C. HENDRICKSON   2,950,927
DISC HARROW
Filed July 11, 1958   5 Sheets-Sheet 1

INVENTOR.
CHARLES C. HENDRICKSON,
BY
McMorrow, Berman & Davidson
ATTORNEYS

Aug. 30, 1960 C. C. HENDRICKSON 2,950,927
DISC HARROW
Filed July 11, 1958 5 Sheets-Sheet 2
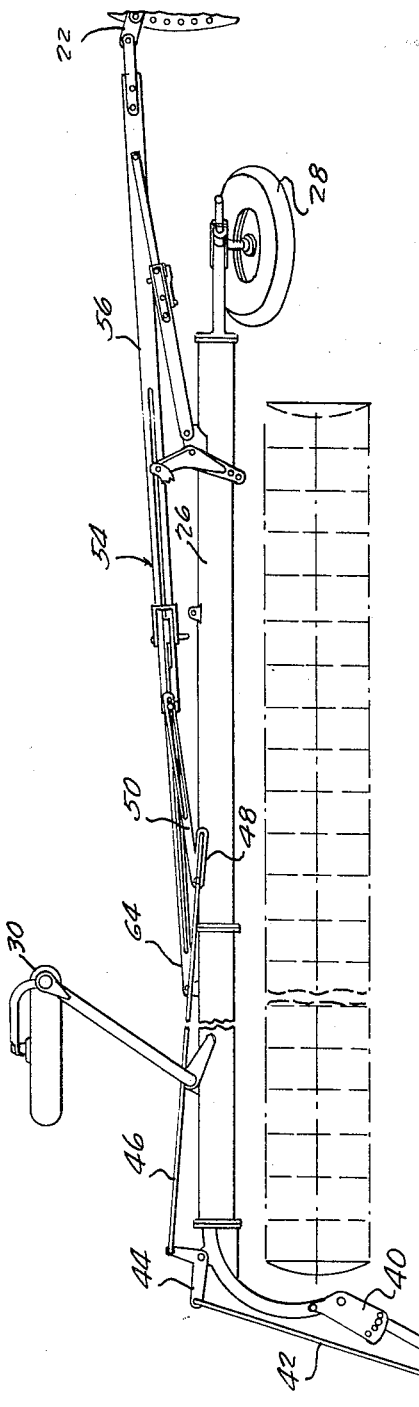
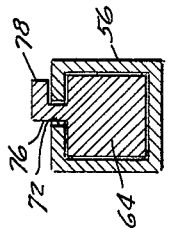
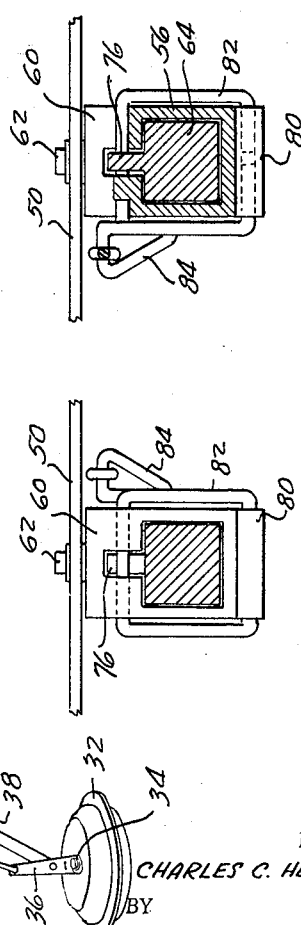
INVENTOR.
CHARLES C. HENDRICKSON,
BY
McMorrow, Berman & Davidson
ATTORNEYS.

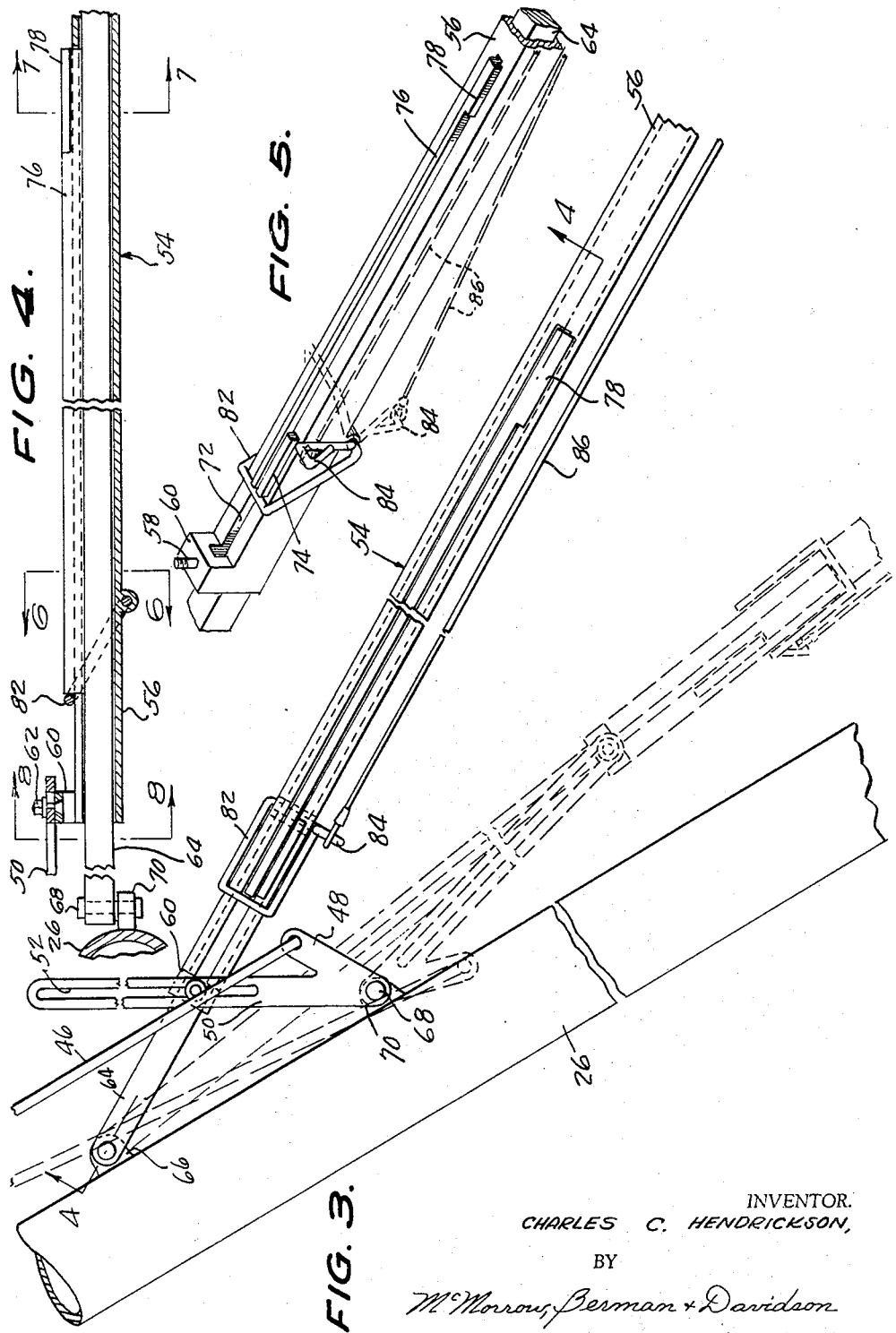

Aug. 30, 1960 C. C. HENDRICKSON 2,950,927
DISC HARROW
Filed July 11, 1958 5 Sheets-Sheet 4
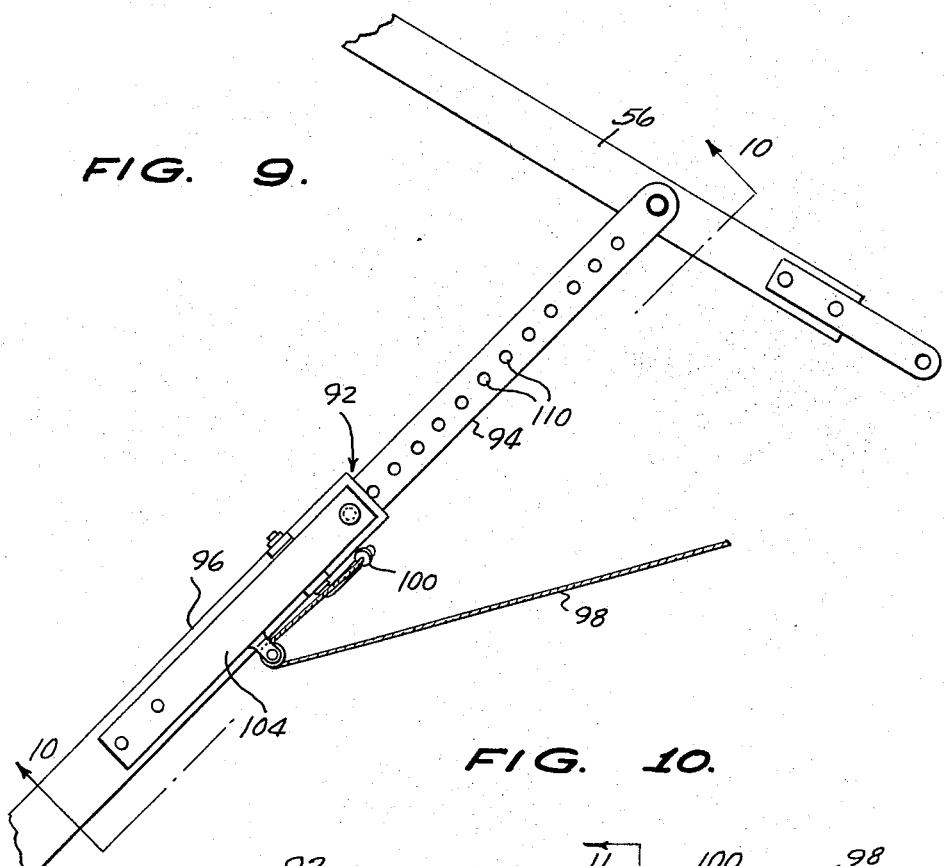
FIG. 9.
FIG. 10.
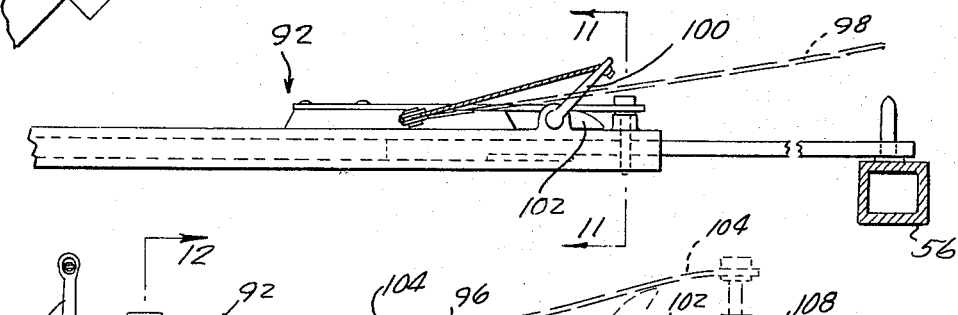
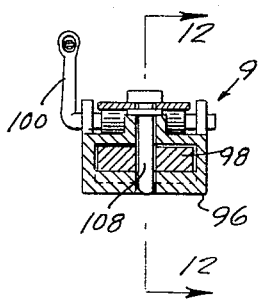
FIG. 11.
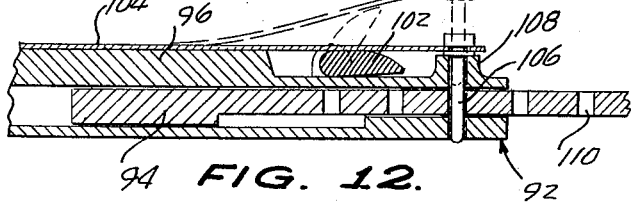
FIG. 12.
INVENTOR.
CHARLES C. HENDRICKSON,
BY
McMorrow, Berman & Davidson
ATTORNEYS.

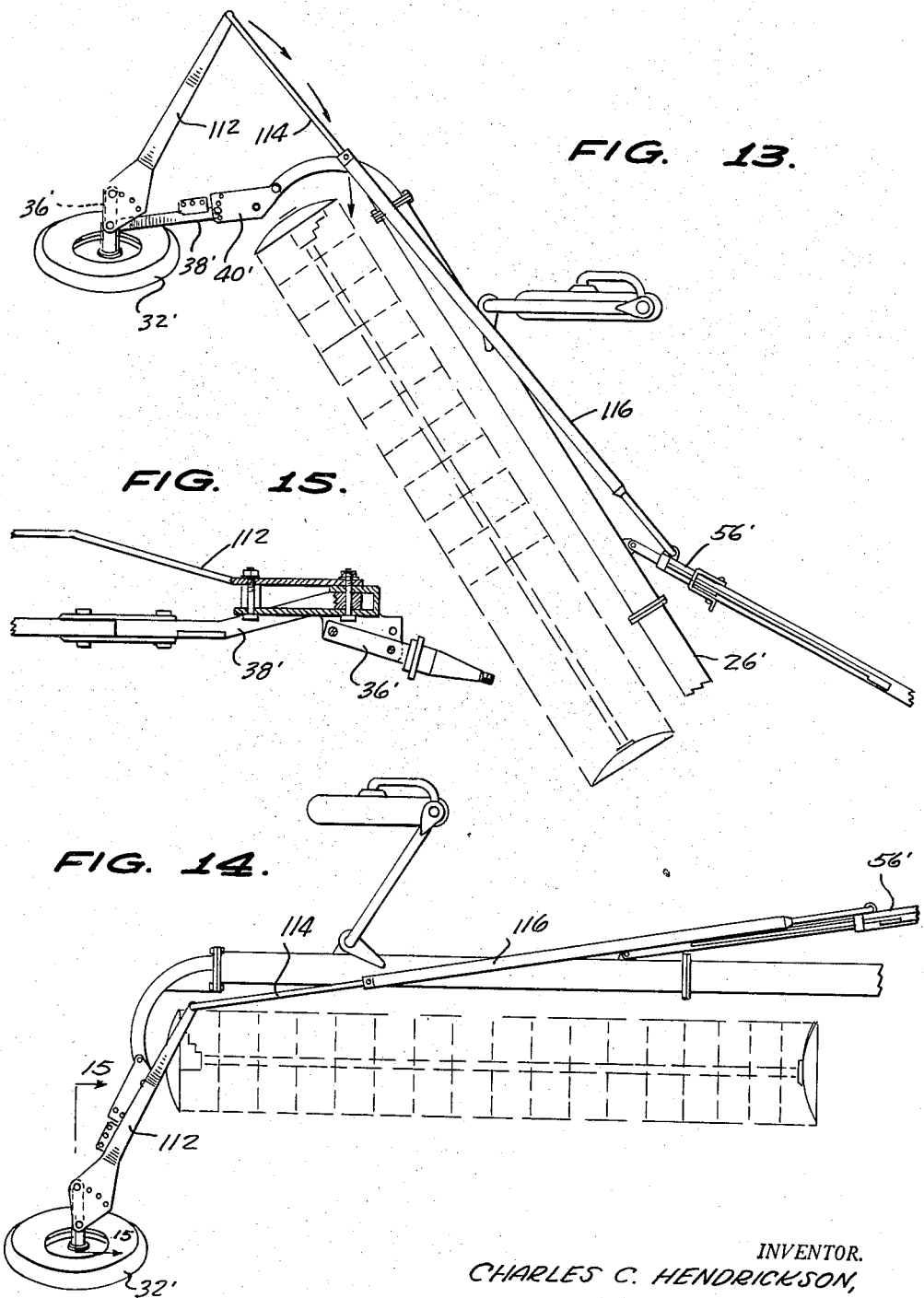

United States Patent Office 2,950,927
Patented Aug. 30, 1960

2,950,927

DISC HARROW

Charles C. Hendrickson, Turner, Mont.

Filed July 11, 1958, Ser. No. 747,915

3 Claims. (Cl. 280—462)

The present invention relates to farm implements and in particular to a disc tiller or harrow.

An object of the present invention is to provide a disc tiller or harrow which may be shifted from the working position extending crosswise behind a tractor or other other towing vehicle to a longitudinal trailing position for travel through gates or over highways, the shifting of the harrow being accomplished by the tractor operator without necessitating his leaving the operator's seat on the tractor.

Another object of the present invention is to provide a disc harrow which may be shifted from a longitudinal trailing position behind a tractor or other towing vehicle to a crosswise position without the necessity of the tractor operator leaving the tractor operator's seat on the tractor or other towing vehicle.

A further object of the present invention is to provide a disc harrow which is efficient in operation, one which may execute relatively sharp right and left turns, and one which is economically feasible.

These and other objects and advantages of the present invention will be fully apparent from the following description when taken in conjunction with the annexed drawings, in which:

Figure 2 is a view of the disc harrow shown in the longitudinal trailing position rearwardly of the tractor, only a portion of the tractor drawbar being shown;

Figure 3 is a plan view of a portion of the frame of the harrow with a portion of the towing beam, the dotted line showing indicating the extensile position of the beam and the over-center element in over-center position;

Figure 4 is a view taken on the line 4—4 of Figure 3;

Figure 5 is a fragmentary isometric view of the locking means on the beam;

Figure 6 is a view on an enlarged scale, taken on the line 6—6 of Figure 4;

Figure 7 is a view on an enlarged scale, taken on the line 7—7 of Figure 4;

Figure 8 is a view on an enlarged scale, taken on the line 8—8 of Figure 4;

Figure 9 is a fragmentary plan view of the auxiliary beam used with the harrow of the present invention for adjusting the angularity of its crosswise position with respect to the towing vehicle;

Figure 10 is a side view in elevation of the assembly shown in Figure 9, a portion being broken away;

Figure 11 is a view on an enlarged scale, taken on the line 11—11 of Figure 10;

Figure 12 is a view taken on the line 12—12 of Figure 11;

Figure 13 is a plan view of a modified form of the harrow according to the present invention, showing the harrow in the crosswise position;

Figure 14 is a plan view of the assembly shown in Figure 13, showing the harrow in the longitudinal trailing position; and Figure 15 is a view on an enlarged scale, taken on the line 15—15 of Figure 14.

Figure 1:
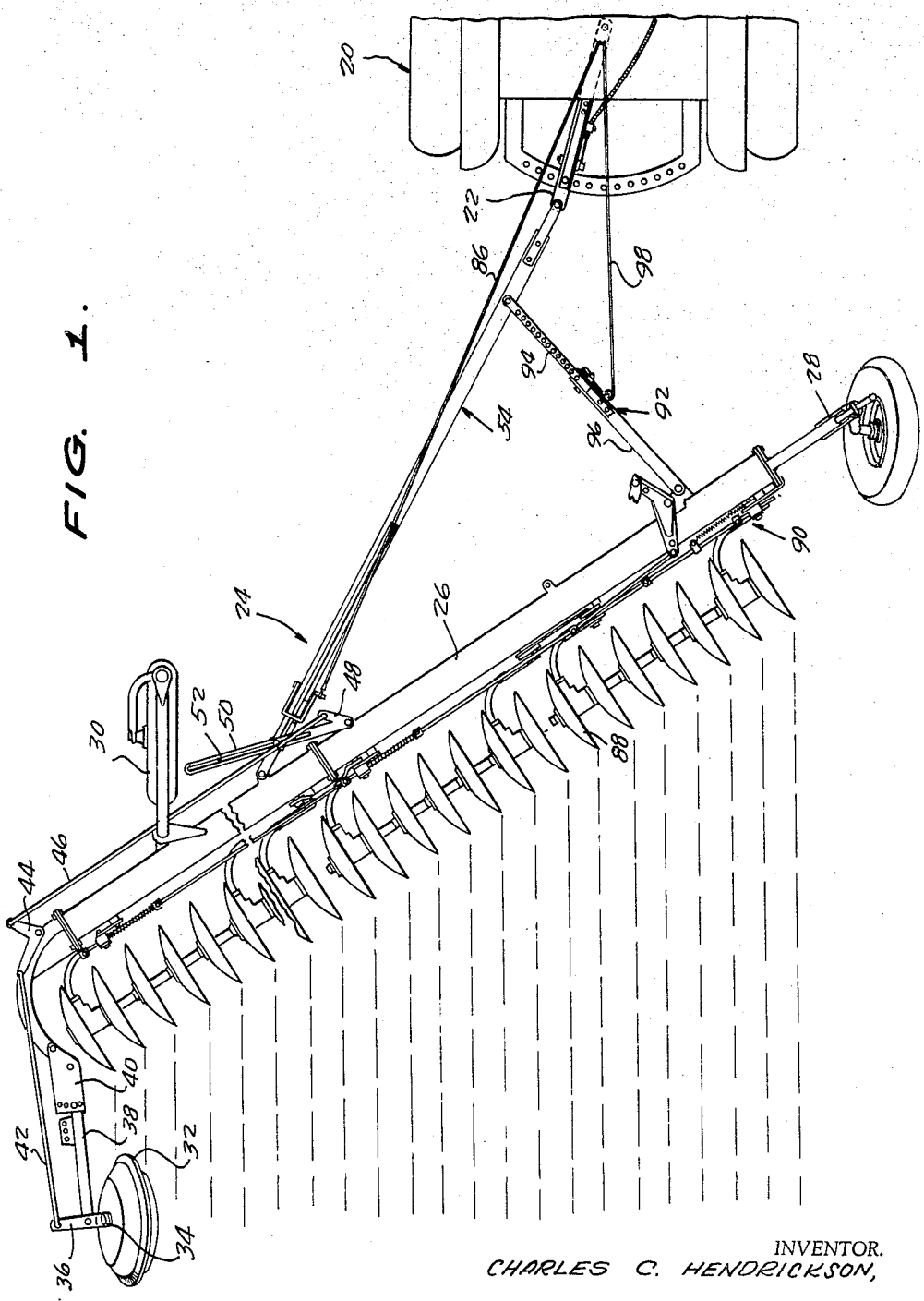
Figure 1 is a plan view of the disc harrow according to the present invention, shown in its working or crosswise position with respect to a tractor, a portion of the tractor being broken away.

Referring in greater detail to the drawings in which like numerals indicate like parts throughout the several views, the reference numeral 20 designates generally a tractor having a longitudinally projecting drawbar 22. The disk harrow of the present invention is designated generally by the reference numeral 24 and includes a single horizontally disposed frame member 26 having a caster wheel assembly 28 on one end thereof and a second caster wheel assembly 30 forwardly of and secured to the frame member 26 inwardly of the other end thereof.

As shown in Figure 1, the harrow 24, in a working position, extends in a direction crosswise of the drawbar 22 with the end of the frame member 26 carrying the wheel assembly 28 near the drawbar 22 and the end of the frame member 26 beyond and adjacent the wheel assembly 30 outwardly of and remote from the drawbar 22. It is understood that the drawbar 22 extends rearwardly of the tractor 20.

Means is provided by the present invention connecting the harrow 24 to the drawbar 22 for movement from the crosswise position shown in Figure 1 to a position in which the harrow 24 extends in a direction longitudinally of and trailing the drawbar 22, as shown in Figure 2. In the latter position, the end of the frame member 26 carrying the caster wheel assembly 28 is contiguous to the drawbar 22 and the end of the frame member 26 beyond and adjacent the caster wheel assembly 30 is longitudinally rearwardly of and remote from the drawbar 22. The frame member 26 is also supported upon a furrow wheel 32 which is rotatable on a fixed axle 34 having its major axis arranged transversely with respect to the tractor 20.

The axle 34 is mounted upon one end of a lever 36 which is pivotally connected intermediate its ends to the free end of an arm 38 projecting rearwardly from the frame member 26 and connected thereto by means of an adjustable coupling member 40. The free end of the lever 36 remote from the furrow wheel 32 is pivotally connected by means of a tie bar 42 to the free end of one leg of an L-shaped lever 44. The lever 44 is connected intermediate its ends, at the juncture of its legs, to the adjacent end of the frame member 26 for pivotal movement about a vertical axis.

Another tie bar 46 has one end pivotally connected to the free end of the other leg of the lever 44 and its other end pivotally connected to an arm 48 which constitutes a portion of an over-center element. The arm 48 is shown most clearly in Figure 3 and the action of the over-center element is illustrated by the dotted lines in that figure. Another arm 50 is formed integrally with the arm 48 and together with the arm 48 forms a V-shaped element having its apex pivotally connected to the frame member 26 intermediate the ends of the latter. The arm 50 is longer than the arm 48 and is provided with a longitudinally extending slot 52, closed at both ends, extending inwardly from the free end of the arm 50 to a point substantially contiguous with the free end of the arm 48.

A telescopic extensible and retractable beam 54 has one end pivotally connected to the free end of the draw bar 22 and the other end pivotally connected to the frame member 26 at a point between the connection of the arms 48 and 50 and the end of the frame member 26 carrying the L-shaped lever 44. The outer and forward section 56 of the beam 54 has an upstanding pivot pin 58 projecting upwardly from an enlarged block portion 60 provided on the end of the section 56 remote from the drawbar 22. The pivot pin 58 is slidable within the slot 52 and suitable securing means such as a nut and washer assembly 62 threaded on the free end of the pivot pin 58 retains the arm 50 in its sliding connection to the adjacent end of the beam section 56.

The inner and rearward section 64 of the beam 54 is slidable within the section 56 and has one end pivotally connected to a boss 66 projecting from the frame member 26.

As shown in Figures 1 and 2, when the sections 56 and 64 of the beam 54 extend from the retracted position shown in Figure 1 to the extended position shown in Figure 2, the pivot pin 56 in the slot 52 effects the swinging movement of the arm 50 and connected arm 48 about the pivot pin 68 which extends through the second boss 70 on the frame member 26. This movement of the arms 48 and 50 effects the pulling movement of the tie rods 42 and 46 to turn the lever 36 in its pivotal connection on the arm 38 to maintain the wheel 32 in its position with its axle 34 transversely of the tractor 20. Upon movement of the linkage which comprises the tie rod 42, lever 44, tie rod 46 and arms 48 and 50 from the full line position shown in Figure 3 to the dotted line position, the arm 48 reaches an over-center position, locking the tie rod 46 against longitudinal movement relative to the frame member 26 and taking the strain off of the linkage which holds the axle 34 in the transverse position.

Means is provided by the present invention operable from the tractor 20 and releasably engaging the harrow for holding the harrow in either the crosswise position of Figure 1 or in the longitudinally trailing direction position of Figure 2. This means constitutes a novel latch arrangement illustrated clearly in Figures 4 and 5.

The upper side of the beam section 56 is provided with a longitudinally extending slot 72 extending inwardly from the end remote from the drawbar 22 to a point spaced from the drawbar 22. An elongated block 74 is mounted upon the exterior face of the section 56 adjacent to the slot 72 at a point spaced from the block portion 60 of the section 56. Projecting upwardly from the upper face of the beam section 64 is an elongated tongue 76 conformably shaped to fit within the slot 72, the tongue 76 having a lip portion 78 extending inwardly from the end of the tongue 76 remote from the connection of the beam section 64 with the frame member 26. The tongue 76 and lip portion 78 are exteriorly of the slot 72 and the lip portion 78 engages the adjacent end of the block 74 upon execution of sliding movement of the section 64 within the section 56 from the retracted position to the extended position. A transversely arranged sleeve 80 is secured to the underside of the beam section 56 at a point spaced from the block portion 60 and loosely supports the inwardly turned portions of the legs of a U-shaped latch element 82 having its legs extending downwardly along the sides of the beam section 56 and its bight overlying the upper face of the beam section 56 and frictionally engaging one end of the block 74, as shown in Figure 5. An arm 84 extends upwardly from one leg of the latch element 82 at a point adjacent its connection with the sleeve 80. A cable or rope 86, shown in dotted lines in Figure 5, has one end fastened to the free end of the arm 84 and the other end secured to the tractor 20 at a point accessible to the operator of the tractor 20.

The application of a manually applied pulling force to the rope 86 will effect the swinging movement of the arm 84 and the attached latch element 82 from the position in which the adjacent end of the tongue 76 and the end of the block 74 are frictionally engaged by the bight of the latch element 82, as shown in full lines in Figure 5, to the dotted line position shown in Figure 5 in which the arm 84 extends forwardly and downwardly and the bight of the element 82 rests on the tongue 76. This frees the tongue 76 and upon forward movement of the tractor 20, the section 64 of the beam 54 will move from its retracted position to the extended position in which the lip portion 78 engages the adjacent end of the block 74 and the bight of the latch element 82 drops over the end of the lip portion 78 and holds the lip portion 78 against longitudinal movement forwardly with respect to the beam section 56.

The harrow 24 includes a plurality of discs 88 mounted for free rotation and for movement into and out of a ground-working position by means of conventional mounting members and linkage, as at 90 in Figure 1, the means mounting the discs 88 and the operating mechanism of the linkage 90 not being described as not being a part of the present invention.

Means is provided for adjusting the crosswise position of the harrow 24 and consists in an auxiliary beam 92 having telescoping sections 94 and 96. One end of the section 94 is pivotally connected to the beam section 56 at a point inwardly of and spaced from the connection to the drawbar 22 and one end of the section 96 is pivotally connected to the frame member 26 inwardly of the caster wheel assembly 28.

Latch means is provided for holding the sections 94 and 96 in any position of their adjusted telescopic movement, such latch means being operable from the seat of the tractor 20 without the necessity of the operator leaving the seat. This means is shown in Figures 9 and 10 in which the reference numeral 98 represents a control cable or rope having its free end secured to an upwardly extending latch arm 100 carrying a cam member 102 in normal superimposed abutting relation with respect to the upper face of the section 96 adjacent the free end thereof. A leaf spring 104 has one end fixed to the beam section 96 and the other end connected to a vertically extending latch pin 106 projecting through a hollow boss 108 provided on the end of the beam section 96 and through a selected one of a plurality of holes 110 provided in the beam section 94.

It will be seen that upon application of a pulling force to the rope 98, the leaf spring 104 will be raised by the cam member 102 to a position in which the pin 106 is disengaged from the hole 110 in the beam section 94. This permits the operator of the tractor 20 to effect the extensile or retractile movements of the beam sections 94 and 96 with respect to each other to adjust the crosswise position of the harrow 24 as desired.

In Figures 13 to 15, a modified form of the linkage connecting the furrow wheel to the harrow is shown in which several linkage components are eliminated and a simplified means for controlling the transverse relation position of the axle of the furrow wheel is employed. In this embodiment, the frame member 26' carries at one end the coupling member 40' and the arm 38'. The lever 36' which carries the furrow wheel 32' is pivotally connected intermediate its ends to the free end of the arm 38'. An actuating arm 112 has one end adjustably connected to the free end portion of the lever 36' and its other end pivotally connected to a tie rod 114 at one end of the latter. The tie rod 114 is telescopically arranged within a tube member 116 which has its end remote from the tie rod 114 pivotally connected to the rearward end portion of the beam section 56'.

The arm 112, rod 114, and the tube member 116 constitute linkage connecting the furrow wheel 32' to the frame member 26' for maintaining the rotational axis of the wheel 32' in the transverse relation position with respect to the towing vehicle when the harrow is moved from the crosswise position shown in Figure 13 to the longitudinally aligned and trailing position shown in Figure 14.

In use, the operator of the tractor 20 is permitted to shift the harrow 24 from the crosswise position to the trailing longitudinal position without leaving his seat on the tractor 20. Upon the application of a pulling force to the rope 86, the latch element 82 is released and the operator of the tractor 20 may draw the tractor ahead to shift the harrow 24 from the crosswise position to the longitudinal position. Upon release of the rope 86, the weight of the latch element 82 will hold it in its forward position engaging the forward portion of the tongue 76, locking the harrow 24 against movement from the longitudinal trailing position. When it is desired to return the harrow 24 to the crosswise position, it is merely necessary to apply another pulling force to the rope 86 to flick the latch element 82 over-center to its former position and releasing the tongue 76. Upon backwards movement of the tractor 20, the reluctance of the harrow 24 to movement over the ground surface will swing it from the longitudinal position to the crosswise position with the furrow wheel 32 maintained in its position of rotation about an axis which remains transverse with respect to the tractor 20. The latch element 82 will then engage the rearward end portion of the tongue 76 and prevent its longitudinal movement in the slot 72. This locks the harrow 24 in the crosswise position.

When it is desired to adjust the angularity of the harrow 24 in its crosswise position, the operator need only apply a pulling force to the rope 98 to release the pin 106 from the one hole 110, then, by advancing or retracting the tractor 20, the extensile or retractile movement of the section 94 within the section 96 will be effected for repositioning the pin 106 in another selected hole 110.

What is claimed is:

1. The combination with a towing vehicle having a drawbar projecting longitudinally from the rear end thereof, of a disc harrow including a single horizontally disposed frame member having a first caster wheel assembly on one end thereof and having a second caster wheel assembly forwardly of and secured to said frame member inwardly of the other end thereof, said harrow being positioned behind and spaced from said drawbar so that the frame member extends in a direction crosswise of said drawbar with one of its ends near said drawbar and the other of its ends outwardly of and remote from said drawbar, means connecting said frame member to said drawbar for movement from the aforesaid position to a position in which said frame member extends in a direction longitudinally of said drawbar with said one end contiguous to said drawbar and said other end longitudinally rearwardly of and remote from said drawbar, a furrow wheel rotatable about an axle transverse with respect to said vehicle positioned adjacent said other end of said frame member, means comprising a lever pivotally connected intermediate its ends to said frame member, linkage connecting said axle to said lever, a V-shaped over-center element pivotally connected at its apex to said frame member, means connecting said lever to one of the arms of said over-center element, a beam connecting said drawbar to said frame member, and means slidably connecting said beam to the other arm of said over-center element, said means connecting said furrow wheel to said frame member so that said furrow wheel axle is maintained in the transverse relation with respect to said vehicle upon execution of the movement of said frame-member from the crosswise direction position to the longitudinal direction position, and means operable from said vehicle and releasably engaging said harrow for holding said harrow in either of the crosswise or longitudinal direction positions.

2. The combination with a towing vehicle having a drawbar projecting longitudinally from the rear end thereof, of a disc harrow including a single horizontally disposed frame member having a first caster wheel assembly on one end thereof and having a second caster wheel assembly forwardly of and secured to said frame member inwardly of the other end thereof, said harrow being positioned behind and spaced from said drawbar so that the frame member extends in a direction crosswise of said drawbar with one of its ends near said drawbar and the other of its ends outwardly of and remote from said drawbar, means including an extensible and retractable beam having one end pivotally connected to said drawbar and having the other end pivotally connected to said frame member intermediate the ends thereof connecting said frame member to said drawbar for movement from the aforesaid position to a position in which said frame member extends in a direction longitudinally of said drawbar with said one end contiguous to said drawbar and said other end longitudinally rearwardly of and remote from said drawbar, a furrow wheel rotatable about an axle transverse with respect to said vehicle positioned adjacent said other end of said frame member, means comprising an over-center element pivotally connected to said frame member intermediate its ends thereof, linkage connecting said axle to said element, and means slidably connecting said beam to said over-center element, said means connecting said furrow wheel to said frame member so that said furrow wheel axle is maintained in the transverse relation with respect to said vehicle upon execution of the movement of said frame member from the crosswise direction position to the longitudinal direction position, and means operable from said vehicle and releasably engaging said harrow for holding said harrow in either of the crosswise or longitudinal direction positions.

3. The combination with a towing vehicle having a drawbar projecting longitudinally from the rear end thereof, of a disc harrow including a single horizontally disposed frame member having a first caster wheel assembly on one end thereof and having a second caster wheel assembly forwardly of and secured to said frame member inwardly of the other end thereof, said harrow being positioned behind and spaced from said drawbar so that the frame member extends in a direction crosswise of said drawbar with one of its ends near said drawbar and the other of its ends outwardly of and remote from said drawbar, means connecting said frame member to said drawbar for movement from the aforesaid position to a position in which said frame member extends in a direction longitudinally of said drawbar with said one end contiguous to said drawbar and said other end longitudinally rearwardly of and remote from said drawbar, a furrow wheel rotatable about an axle transverse with respect to said vehicle positioned adjacent said other end of said frame member, means comprising an over-center element pivotally connected to said frame member intermediate its ends, linkage connecting said element to said axle, an extensible and retractable beam having one end connected to said drawbar and having the other end pivotally connected to said element, and means slidably connecting the beam to said over-center element, said means connecting said furrow wheel to said harrow so that said furrow wheel axle is maintained in the transverse relation with respect to said vehicle upon execution of the movement of said frame member from the crosswise direction position to the longitudinal direction position, and means operable from said vehicle and releasably engaging said harrow for holding said harrow in either of the crosswise or longitudinal direction positions.

References Cited in the file of this patent

UNITED STATES PATENTS

| | | |
|---|---|---|
| 1,472,768 | Dickinson | Oct. 30, 1923 |
| 2,658,770 | Koenig | Nov. 10, 1953 |
| 2,684,618 | Kelman | July 27, 1954 |
| 2,706,881 | McDonald | Apr. 26, 1955 |

OTHER REFERENCES

John Deere: Pre-Delivery Instructions, PDI-W-25-356. Received in Patent Office April 26, 1956.